W. L. CHITTUM.

CAR MOVER.

APPLICATION FILED MAR. 16, 1914.

Reissued May 26, 1914. 13,734.

Witnesses

B. B. Brown

Henry T. Bright

Inventor

W. L. Chittum

By Randolph Randolph

Attorneys

UNITED STATES PATENT OFFICE.

WILLIAM LEWIS CHITTUM, OF SPRING HILL, WEST VIRGINIA.

CAR-MOVER.

13,734. Specification of Reissued Letters Patent. Reissued May 26, 1914.

Original No. 1,034,081, dated July 30, 1912, Serial No. 658,206. Application for reissue filed March 16, 1914. Serial No. 825,185.

*To all whom it may concern:*

Be it known that I, WILLIAM L. CHITTUM, a citizen of the United States, residing at Spring Hill, in the county of Kanawha, State of West Virginia, have invented certain new and useful Improvements in Car-Movers; and I do hereby declare the following to be a full, clear, and exact description of the invention, such as will enable others skilled in the art to which it appertains to make and use the same.

This invention relates to car movers.

The object of the invention resides in the provision of a car mover adapted to be easily positioned in operative relation to one of the wheels of a car so that the actuation of the device will enable the movement of the car to be instituted, the employment of the device being particularly useful where it is desired to move cars short distances.

With the above and other objects in view, the invention consists in the details of construction, and in the arrangement and combination of parts to be hereinafter more fully described and particularly pointed out in the appended claims.

In describing the invention in detail, reference will be had to the accompanying drawings wherein like characters of reference denote corresponding parts in the several views, and in which—

Figure 1:
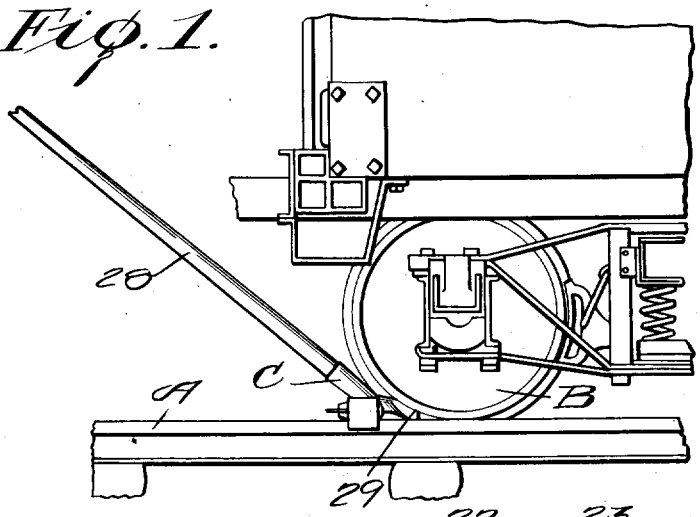
Figure 2:
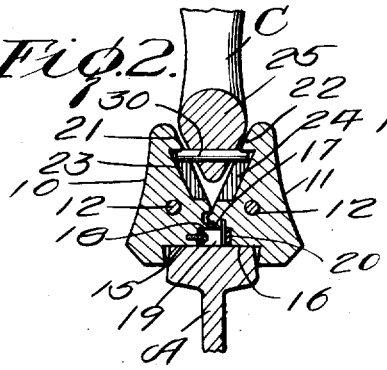
Figure 3:
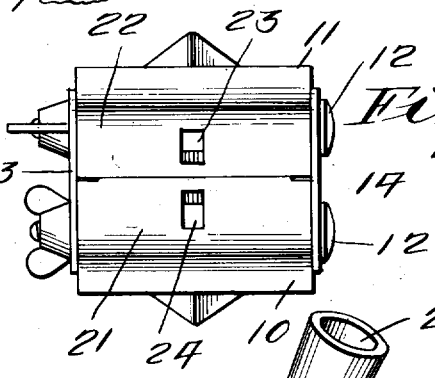
Figure 4:
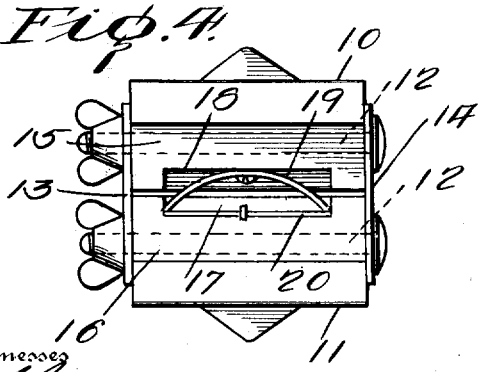
Figure 5:
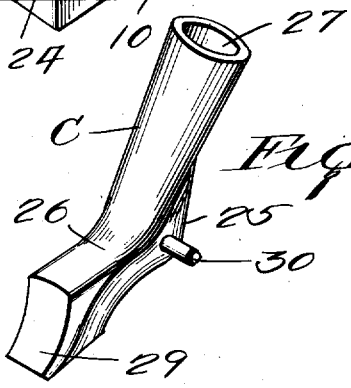

Figure 1 is a side elevation of the device showing same mounted upon a rail and in operative relation to one of the wheels of a car. Fig. 2, an enlarged section on the line 2—2 of Fig. 1, Fig. 3, a top view of the supporting block of the device with the operating lever removed, Fig. 4, a bottom view of the supporting block detached from the rail, and Fig. 5 a detail perspective view of the operating lever.

Referring to the drawings, A indicates an ordinary railroad rail and B one of the wheels of a car truck adapted for travel on the rail A.

The device is shown as comprising a pair of opposed clamping members 10 and 11. Passing longitudinally through each of the clamping members is a bolt 12 and connecting the terminals of these bolts at opposite ends of the clamping members 10 and 11 respectively are links 13 and 14. Said links constituting the connection between the clamping members whereby the latter may be moved toward and away from each other at their upper and lower ends. The lower ends of the clamping members 10 and 11 respectively are provided at their outer sides with flanges 15 and 16 which are adapted to engage respective sides of the tread portion of the rail A when the block member of the device is supported upon said rail, and the lever member of the device to be hereinafter referred to, is actuated to effect the movement of the wheel B. The lower ends of the clamping members 10 and 11 are further provided at their inner sides with cut-away portions 17 and 18 respectively. Mounted in the cutaway portion 18 is a bow spring 19 the terminals of which are adapted to engage a bearing plate 20 mounted in the cutaway portion 17.

It will be noted that as the lower ends of the clamping members 10 and 11 are moved toward each other the terminals of the bow spring 19 slide along the bearing plate 20 until they engage respectively the ends of the cutaway portion 17. During this movement of the lower ends of the clamping members the bow spring 19 is energized so that when the force effecting the movement of the lower ends of the clamping members toward each other is removed the spring 19 will react to force the lower ends of said clamping members away from each other.

The portions of the clamping members which are disposed above the links 13 and 14 are tapered as at 21 and 22 respectively and the inner faces of these tapered portions of the clamping members are provided respectively with similar correspondingly disposed transverse recesses 23 and 24. The operating lever of the device is indicated at C and is shown as including angular portions 25 and 26 the former of which is provided at its free end with a socket 27 to receive a detachable operating handle 28, while the portion 26 has its free end terminating in a curved face 29 adapted to engage the periphery of the wheel B during the operation of the device. Extending transversely through the lever C at the junction of the angular portions 25 and 26 is a pivot pin 30 the ends of which are disposed respectively in the recesses 23 and 24.

In the operation of the device the clamping members 10 and 11 are seated upon the rail A with the flanges 15 and 16 disposed on opposite sides of the tread of said rail respectively. The clamping members 10 and 11 are then moved longitudinally of the rail A until the curved face 29 of the lever C engages the periphery of the wheel B. With the parts of the device in this position the handle 28 is pressed sharply toward the rail A so as to bring the curved face 29 of the lever C against the periphery of the wheel B with great force. The initial movement of the handle 28 will force the pivot pin 30 to the lower end of the recesses 23 and 24 and at the same time cause the upper ends of the clamping members to be moved away from each other so as to force the flange 15 and 16 into clamping relation with the rail A; such clamping relation being intensified in proportion to the force applied to the handle 28. Further movement of the handle 28 toward the rail A will result in partial rotation of the wheel B as is apparent. As soon as the pressure on the handle 28 is released the spring 19 will move the lower ends of the clamping members 10 and 11 away from each other so that they may again be moved longitudinally of the rail A into proximity to the wheel B.

What is claimed is:

1. A car mover comprising a pair of clamping members, links disposed across the ends of said clamping members, said links being pivotally connected at their terminals to said members respectively, longitudinal flanges on the outer sides of the lower ends of the clamping members, spring means constantly tending to force the lower ends of the clamping members away from each other, the clamping members being further provided respectively with tapered upper ends having recesses in their respective inner faces, and a lever provided with a transverse pivot pin having its ends engaged in said recesses respectively and having a curved terminal for engaging the periphery of a wheel.

2. A car mover comprising a pair of clamping members, links disposed across the ends of said clamping members, said links being pivotally connected at their terminals to said members respectively, longitudinal flanges on the outer sides of the lower ends of the clamping members, said clamping members being provided at the inner sides of their lower ends with cutaway portions, a bow spring mounted in one of said cutaway portions having its terminals engaging in the other cutaway portion, the clamping members being further provided respectively with tapered upper ends having recesses in their respective inner faces, and a lever provided with a transverse pivot pin having its ends engaged in said recesses respectively and having a curved terminal for engaging the periphery of a wheel.

In testimony whereof, I affix my signature, in presence of two witnesses.

WILLIAM LEWIS CHITTUM.

Witnesses:

C. E. LAURENCE,

B. N. BURRUSS.

Copies of this patent may be obtained for five cents each, by addressing the "Commissioner of Patents, Washington, D. C."